United States Patent [19]

Allsopp

[11] 4,103,099
[45] Jul. 25, 1978

[54] ELECTRIC FURNACES

[75] Inventor: Peter James Allsopp, Streatley, England

[73] Assignee: The Secretary of State for Industry in Her Britannic Majesty's Government of the United Kingdom of Great Britain and Northern Ireland, London, England

[21] Appl. No.: 669,970

[22] Filed: Mar. 24, 1976

[30] Foreign Application Priority Data

Mar. 25, 1975 [GB] United Kingdom ............... 12505/75

[51] Int. Cl.² ............................................. F27D 11/04
[52] U.S. Cl. ......................................... 13/7; 165/135; 13/8
[58] Field of Search ..................... 176/69, 82; 165/135; 13/7, 8

[56] References Cited

U.S. PATENT DOCUMENTS

| 3,164,487 | 1/1965 | Carley-Macauly | 176/69 |
| 3,322,644 | 5/1967 | Benson | 176/69 |
| 3,788,089 | 1/1974 | Graves | 165/135 |
| 3,809,149 | 5/1974 | Deutsch | 165/135 |
| 3,900,358 | 8/1975 | Bujas | 176/82 |
| 4,015,068 | 3/1977 | Vohler | 13/7 |

Primary Examiner—Charles J. Myhre
Assistant Examiner—Margaret A. LaTulip
Attorney, Agent, or Firm—Cameron, Kerkam, Sutton, Stowell & Stowell

[57] ABSTRACT

Impregnation of a porous carbon body involving deposition of carbon from a gas can be effected by establishing a thermal gradient across the body such that carbon is deposited at a boundary which advances through the body. The present furnace is for use in such a process and comprises a heater element with which, in use, the body is in contact and a cooled surface facing the element, characterized in that the latter surface is covered with a layer of thermal insulating material to reduce the thermal gradient across the body. This improves the economy of the process. The insulating material is suitably fibrous, eg graphite felt, and is protected by a layer of relatively low permeability, eg graphite sheet, to prevent deposition of carbon which would reduce its insulation properties.

Such a furnace suitable for impregnating flat bodies, eg brake discs, comprises flat mutually parallel electrical heater elements connected electrically in series having water-cooled felt-covered panels located between them and outside the outermost elements.

11 Claims, 3 Drawing Figures

ELECTRIC FURNACES

BACKGROUND OF THE INVENTION

This invention relates to electric furnaces and has particular application in producing carbon-impregnated articles by the deposition of carbon from a gas within a body of open porosity.

A deposition process is known, e.g. as described in U.S. Pat. No. 3,164,487, in which a thermal gradient is established across the body of open porosity (the body being of relatively low thermal conductivity) such that the temperature in an initial zone of the body is raised to a temperature sufficient to deposit carbon from the gas and thereby impregnate the initial zone, the temperature of remainder of the body being too low to cause deposition. The temperature of the initial zone is then progressively raised to maintain an impregnated/non-impregnated boundary which advances through the body, the rate of rise of temperature being limited so that the zone defined by the advancing boundary is substantially fully impregnated. The gas is normally a hydrocarbon and the process is mainly applicable to the impregnation of porous carbon bodies, e.g. made of fine carbon particles, or of carbon fibres or fabrics.

The present invention provides a furnace suitable for carrying out the above process with increased economy. In one form the invention provides a furnace suitable for impregnating simultaneously a plurality of bodies, particularly flat bodies such as sheets, or discs for use in disc brake assemblies.

SUMMARY OF THE INVENTION

According to the present invention, in an electric furnace suitable for impregnating a body by a process as aforesaid and comprising a heater element which, in use, the body may contact, said heater element facing a surface arranged to be cooled, the cooled surface is covered with a layer of thermal insulating material facing the heater element in order to reduce the thermal gradient across the body.

Where the thermal insulating material is porous it may be covered in turn by a protective layer of relatively low permeability in order to substantially reduce or prevent deposition of products in the insulating material which would reduce its insulating properties. The insulating material may be a fibrous graphite material such as graphite felt, and the protective layer may be graphite sheet.

The furnace may comprise a sealable chamber including:

a plurality of flat electrical heater elements mounted therein in spaced parallel relationship with their flat surfaces facing one another;

a flat panel mounted between each pair of heater elements, and preferably also beyond each outermost element, with the surfaces of the panel facing those of the elements, each panel being arranged to be liquid-cooled and said facing surfaces of the panel being covered with a said layer of thermal insulating material;

and connections for supplying electric current to the heater elements for supplying cooling liquid to the panels, for passing gas into the chamber and for extracting gas from the chamber.

The heater elements are preferably connected in series within the chamber and are suitably made of graphite.

The liquid-cooled panels beyond the outermost elements may be constituted by the side-walls of the chamber, and the remaining panels may depend from a removable lid of the chamber. The panels may be hollow and made of metal.

Gas inlets may be provided at both ends of the chamber at each side of each element, and a gas outlet may be provided adjacent the centre of the chamber. Suitably the gas inlets and outlets are in the lid.

DESCRIPTION OF THE DRAWINGS

To enable the nature of the present invention to be more readily understood, attention is directed, by way of example, to the accompanying drawings wherein.

DESCRIPTION OF A PREFERRED EMBODIMENT

Figure 1:
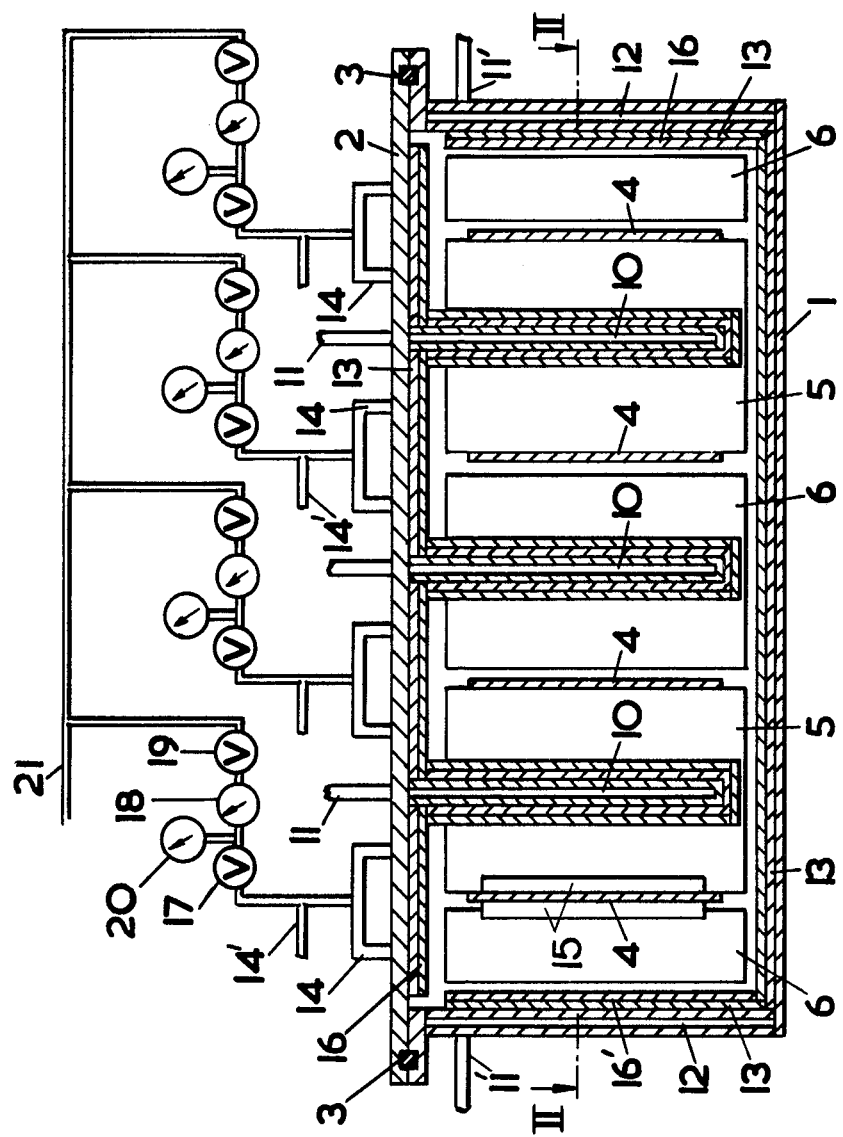
FIG. 1 is a transverse vertical section of a furnace embodying the present invention, on the line I—I in FIG. 2.
Figure 2:
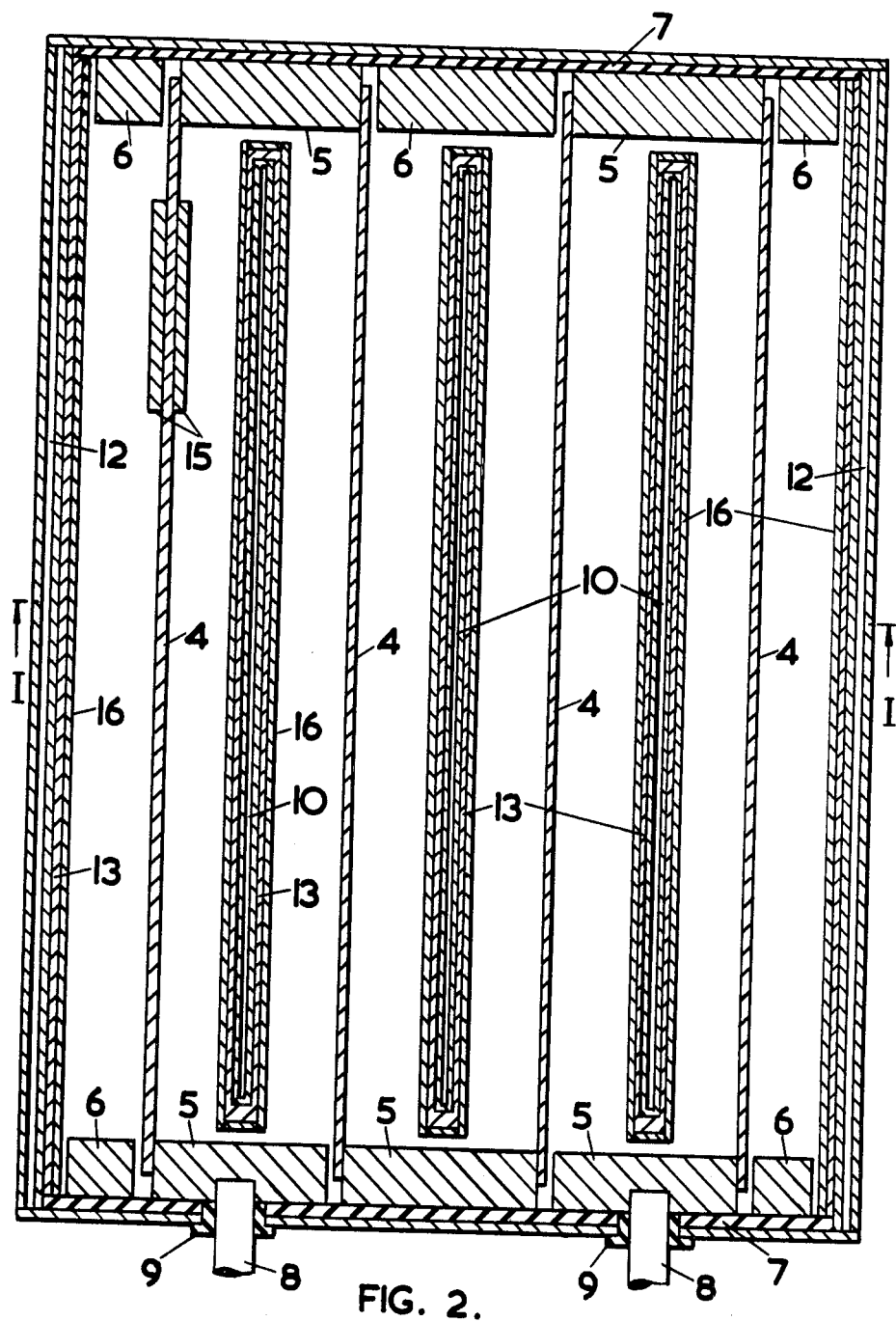
FIG. 2 is a section on the line II—II in FIG. 1.

The furnace shown in FIG. 1 comprises a rectangular chamber consisting of a metal box 1 having a lid 2 which is sealable to the box by O-rings 3 and clamping means (not shown). Four flat graphite electrical heater elements 4 are mounted between the ends of the box on graphite connecting blocks 5. The remaining areas at the ends of the box are occupied by graphite reflecting blocks 6 of similar form to the blocks 5. The elements 4 are equally spaced parallel to one another, and are connected electrically in series by the blocks 5. The blocks 5 are insulated from the metal end-walls of the box by layers 7 of a thermal and electrical insulating material such as Sindanyo, which is an asbestos/cement composite material made by Turners Asbestos Cement Co. Ltd. The blocks are also mounted on the layers 7. External electrical connections are made to the two ends of the series-connected heater elements by water-cooled connections 8 which pass through insulating bushes 9, into the appropriate blocks 5. Alternatively these connections can be made through the floor of the box.

Depending from the lid are three flat panels 10, which are hollow and made of sheet metal. The interior of each panel communicates at each end of the lid with a pipe 11, for the passage of cooling water through the panels. The panels 10 extend parallel to the heater elements and midway between them. The side-walls 12 of the box are also hollow and communicate at each end with a similar pipe 11' for passing cooling water through the walls. The pipes 11 and 11' at the other ends of the lid and side-walls do not appear in the section shown in FIG. 1. Pipes 11 and 11' are connected externally in parallel at each end of the lid to a cooling water supply.

The surfaces of the panels 10, and of the floor, lid and sidewalls of box 1 are covered with a layer of graphite felt thermal insulation 13, which is covered in turn by graphite sheeting 16.

At both ends of the lid two pipes 14 lead into each space between each pair of panels 10, i.e. one at each side of each element 4, for passing the process gas, e.g. propane, into the box. (The pipes 14 at the other end of the lid do not appear in the FIG. 1 section.) Used gas is extracted via a single outlet pipe (not shown) at the centre of the lid. This arrangement of inlet and outlet pipes promotes good uniformity of gas distribution and composition within the box. Each set of four pipes 14 is connected in parallel (the connection to each pair of pipes 14 at the other end of the lid is shown as 14') via a separate first valve 17, flowmeter 18 and second valve 19 to a common gas supply line 21. A pressure gauge 20 is connected between each valve 17 and flowmeter 18. The adjustment of each pair of valves 17 and 19 is balanced to give the desired flowrate at the calibration pressure of the flow gauge. The use of independently balanced and monitored inlets to each space, as described, prevents a partial blockage in one of them (leading to maldistribution of the gas) being undetected.

In use the flat bodies to be impregnated are clamped to the surfaces of the elements 4 and are in good thermal contact therewith. Only two such bodies are shown in the figures for clarity, viz the discs 15. Current is fed to the heater elements and a thermal gradient is thereby established from the hot surfaces of the elements, through the bodies, to the cooled panels or side-walls facing them, thus providing conditions suitable for carrying out the process summarized in the present introduction.

The effect of the thermal insulating layer 13 on the cooled panels is to improve the economy of the process. Without this layer on the panels, the maximum temperature of the "cool" surface facing the bodies 15 would be limited by the boiling point of the cooling water. Layer 13 allows this surface to rise to a higher temperature, thereby preventing an an unnecessarily large thermal gradient being produced across the bodies, which would represent an unnecessary loss of heat and therefore consumption of electric power. The current fed to the elements is progressively increased to raise their temperature and so advance the impregnated/non-impregnated boundary through the discs 15 towards the cooled surfaces, as required.

The graphite sheeting 16 largely excludes the process gas from the felt layer 13 and thus largely prevents the deposition of carbon, or other products of gas pyrolysis, in the layer, which would otherwise occur to some extent even at the relatively low temperature of the felt and would gradually spoil its thermal insulation properties.

Figure 3:
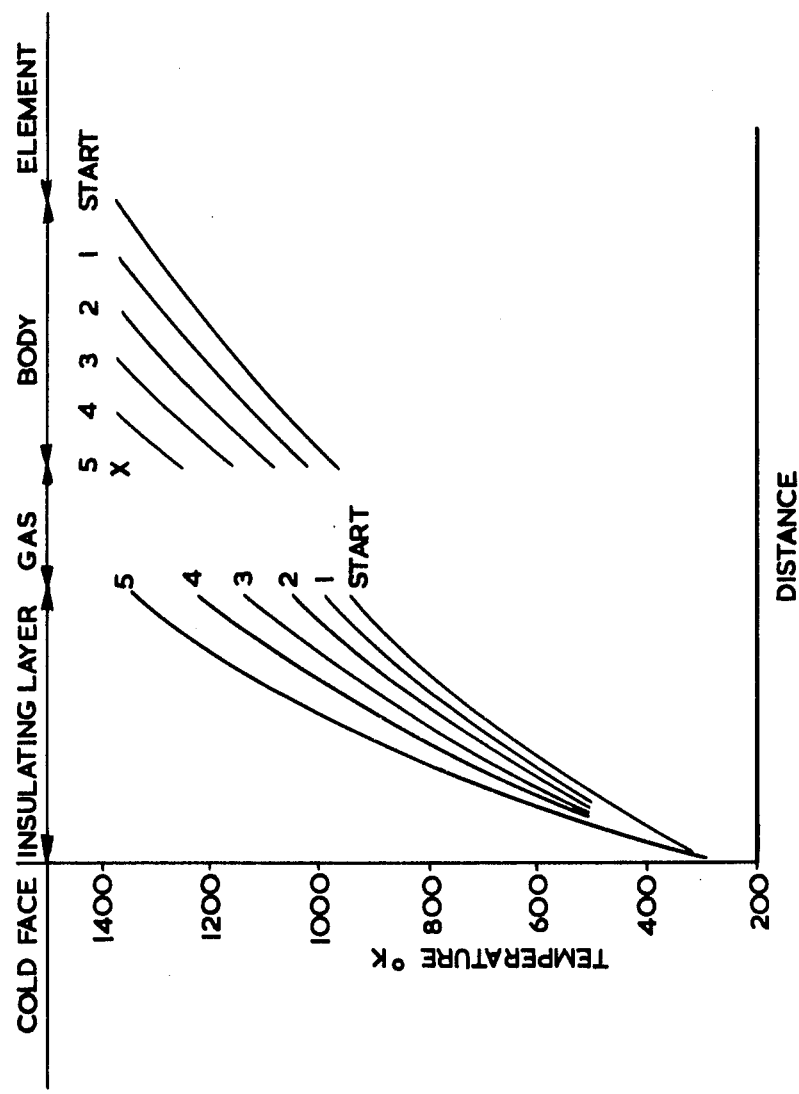
FIG. 3 shows curves of thermal gradients in the present furnace.

FIG. 3 shows typical curves of the thermal gradient between the heater elements and the cooled panel surfaces, and how this gradient changes as impregnation proceeds. The curves shown are calculated for an insulating layer of carbon felt 3cm thick, a body of the same material (before impregnation) 3cm thick, and a deposition temperature of 1373° K (1100° C) as for methane gas. The curves assume that the heat loss from the body is by radiation only, as shown by calculation to be substantially the case, and that there are no end-effects, i.e. the system consists of infinitely long panels and heater elements. The effect of the graphite sheeting over the insulating felt layer is omitted for simplicity in calculating these curves.

The gradient is plotted for five successively impregnated "slices" of equal thickness, the five curves 1-5 showing the gradient at the start (no impregnation) and after impregnation of each succeeding slice. This mathematical treatment is idealised; in practice carbon is deposited over a range of temperatures (though at different rates) and throughout a zone of finite depth rather than at an advancing boundry. It is assumed that the power input to the heater elements is controlled to maintain a constant deposition boundary temperature.

It will be seen that the temperature at the surface of the insulating layer facing the body is only slightly less than at the outer surface of the body itself, thereby reducing the radiative loss from the latter. The thermal gradient across the body, which represents a heat loss, is thereby reduced to an extent which, while allowing the process the proceed as required, improves its economy.

It is emphasised that the curves in FIG. 3 are based on idealised calculations. Thus, while illustrating the effect of the insulating layer, they are only an approximate guide to the actual performance of a given design. Moreover, as already mentioned, the effect of the protective graphite sheeting over the felt insulation is not taken into account.

In one design of furnace in accordance with above description the chamber is 8 ft long by 6 ft wide by 3 ft deep. The graphite felt layer 13 and the graphite sheeting 16 on the panels are each about 1 inch thick. The estimated power consumption is about 1.4 MW at 25V AC to give an element temperature of about 1100° C.

Although in the above-described embodiment the layer of thermal insulating material is applied to cooled panels facing a plurality of flat heater elements, the invention is applicable to furnaces comprising only a single heater element and neither the heater element(s) nor the panel(s) need to be flat.

I claim:

1. An electric furnace for impregnating a porous carbon body by deposition of carbon from a gas comprising a heater element which, in use, the body is adapted to contact, a surface arranged to be cooled facing said heater element, and a layer of insulating material covering the cooled surface and facing the heater element in order to reduce the thermal gradient across the body.

2. A furnace as claimed in claim 1 wherein the insulating material is porous and is covered by a protective layer of relatively low permeability.

3. A furnace as claimed in claim 2 wherein the insulating material is a fibrous graphite material and the protective layer is graphite sheet.

4. A furnace as claimed in claim 1 comprising a sealable chamber which includes:

a plurality of flat electrical heater elements mounted therein in spaced parallel relationship with their flat surfaces facing one another;

a flat panel mounted between each pair of heater elements, and also beyond each outermost element, with the surfaces of the panels facing those of the elements, each panel being arranged to be liquid-cooled and each facing surface of the panel being covered with a said layer of thermal insulating material;

and connections for supplying electric current to the heater elements, for supplying cooling liquid to the panels, for passing gas into the chamber and for extracting gas from the chamber.

5. A furnace as claimed in claim 4 wherein the heater elements are connected in series.

6. A furnace as claimed in claim 4 wherein the heater elements are made of graphite.

7. A furnace as claimed in claim 4 wherein liquid-cooled panels beyond the outermost heater elements are constituted by the side walls of the chamber.

8. A furnace as claimed in claim 7 wherein said chamber includes a removable lid and the remaining panels depend from said removable lid.

9. A furnace as claimed in claim 4 wherein gas inlets are provided at both ends of the chamber at each side of each element.

10. A furnace as claimed in claim 9 wherein a gas outlet is provided adjacent the centre of the chamber.

11. A furnace as claimed in claim 10 wherein said chamber includes a removable lid and the gas inlets and outlet are in the lid.

* * * * *

UNITED STATES PATENT AND TRADEMARK OFFICE
CERTIFICATE OF CORRECTION

PATENT NO. : 4,103,099

DATED : July 25, 1978

INVENTOR(S) : Peter James Allsopp

It is certified that error appears in the above-identified patent and that said Letters Patent are hereby corrected as shown below:

Cover page, item [73] should read:

--Assignee: The Secretary of State for Defence in
Her Britannic Majesty's Government
of the United Kingdom of Great
Britain and Northern Ireland,
London, England--

Signed and Sealed this

Sixth Day of March 1979

[SEAL]

Attest:

RUTH C. MASON
*Attesting Officer*

DONALD W. BANNER
*Commissioner of Patents and Trademarks*